United States Patent
Hattori (10) Patent No.: US 7,287,502 B2
(45) Date of Patent: Oct. 30, 2007

(54) AIR INTAKE DEVICE FOR INTERNAL COMBUSTION ENGINE

(75) Inventor: Shogo Hattori, Kawachi-gun (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 10/552,987

(22) PCT Filed: Apr. 15, 2004

(86) PCT No.: PCT/JP2004/005399

§ 371 (c)(1),
(2), (4) Date: Oct. 13, 2005

(87) PCT Pub. No.: WO2004/092562

PCT Pub. Date: Oct. 28, 2004

(65) Prior Publication Data

US 2006/0207570 A1    Sep. 21, 2006

(30) Foreign Application Priority Data

Apr. 18, 2003    (JP) .............................. 2003-114093

(51) Int. Cl.
*F02M 35/10*    (2006.01)
*F02M 69/48*    (2006.01)
*F02D 41/18*    (2006.01)

(52) U.S. Cl. ........................... 123/184.21; 123/184.47; 123/184.42; 123/184.34

(58) Field of Classification Search ........... 123/184.21, 123/673.2, 681.2, 184.24, 184.34, 184.42, 123/184.47, 673, 681
See application file for complete search history.

(56) References Cited

U.S. PATENT DOCUMENTS 5,515,828 A * 5/1996 Cook et al. .................. 123/436

(Continued)

FOREIGN PATENT DOCUMENTS

EP    1099940    5/2001

(Continued)

OTHER PUBLICATIONS

Japanese Office Action, Application No. 2003-114093, Notice of Reasons for Rejection.

*Primary Examiner*—Stephen K. Cronin
*Assistant Examiner*—Ka Chun Leung
(74) *Attorney, Agent, or Firm*—Squire, Sanders & Dempsey L.L.P.

(57) ABSTRACT

An air intake apparatus for an internal combustion engine includes an air intake manifold that has a plurality of branch pipes that are connected to an internal combustion engine and has a collecting pipe to which a throttle body is connected, in which an air intake quantity that is taken into the internal combustion engine is adjusted using a throttle valve of the throttle body, and in which a fuel injection quantity is adjusted in accordance with the air intake quantity. In this air intake apparatus for an internal combustion engine, an air flow meter that detects a quantity of air that is taken into the internal combustion engine is provided in each branch pipe of an air intake manifold.

1 Claim, 3 Drawing Sheets

U.S. PATENT DOCUMENTS

| | | | |
|---|---|---|---|
| 5,522,367 A | 6/1996 | Reuschenbach et al. | |
| 5,603,295 A * | 2/1997 | Topfer et al. | 123/184.42 |
| 5,623,900 A * | 4/1997 | Topfer et al. | 123/184.42 |
| 5,713,322 A * | 2/1998 | Mausner et al. | 123/184.21 |
| 5,957,102 A | 9/1999 | Schorn | |
| 6,314,952 B1 * | 11/2001 | Turin et al. | 123/673 |
| 6,390,063 B1 * | 5/2002 | Obata et al. | 123/399 |
| 7,111,593 B2 * | 9/2006 | Song et al. | 123/64 |
| 2003/0070494 A1 * | 4/2003 | Kanke et al. | 73/861.19 |

FOREIGN PATENT DOCUMENTS

| | | |
|---|---|---|
| EP | 1 302 756 A2 | 4/2003 |
| JP | S55-135148 | 9/1980 |
| JP | H3-233168 | 10/1991 |
| JP | 4-15388 | 3/1992 |
| JP | 9-4487 | 1/1997 |
| JP | 11-223543 | 8/1999 |

* cited by examiner

AIR INTAKE DEVICE FOR INTERNAL COMBUSTION ENGINE

TECHNICAL FIELD

The present invention relates to an air intake apparatus for a fuel injection type of internal combustion injection and, in particular, to the placement of an air flow rate sensor. Priority is claimed on Japanese Patent Application No. 2003-114093, filed Apr. 18, 2003, the contents of which are incorporated herein by reference.

BACKGROUND ART

In recent years, it is becoming increasingly common for fuel injection type internal combustion engines to be used in vehicles and the like. Among these internal combustion engines are those in which a throttle valve (i.e., a diaphragm valve) is provided on an upstream side of an air intake manifold, and a fuel injection valve and an air flow rate sensor are provided on a downstream side of the throttle valve (see, for example, Japanese Examined Patent Application, Second Publication No. H04-15388). Air flow rate signals output from the air flow rate sensor are input into a control circuit and the fuel injection rate is computed in accordance with the running state of the internal combustion engine. Operations of the fuel injection valve are then controlled by outputting fuel injection rate signals that are based on the computed fuel injection rate from the control circuit.

In order to improve the fuel efficiency and response of the internal combustion engine, it is desirable to detect the air intake quantity (i.e., the quantity of air taken into the internal combustion engine) each time air is taken in, and to then perform the optimum fuel injection based on this air intake quantity. However, in a conventional structure, when the interior of the air intake manifold is in a negative pressure state, the air flow rate sensor ends up measuring an air flow rate which is obtained by adding the air that is taken into the internal combustion engine to the air that fills the interior of the air intake manifold. Therefore, the drawback arises that the optimum fuel injection cannot be performed particularly when the throttle valve is first opened.

The present invention was conceived in view of the above described circumstances and it is an object thereof to provide an air intake apparatus for an internal combustion engine that makes the optimum fuel injection possible by accurately measuring an air intake quantity even when a throttle valve is first opened.

DISCLOSURE OF INVENTION

The present invention is an air intake apparatus for an internal combustion engine that includes: an air intake manifold that has a plurality of branch pipes that are connected to an internal combustion engine and has a collecting pipe to which a throttle body is connected, in which an air intake quantity that is taken into the internal combustion engine is adjusted using a throttle valve of the throttle body, and in which a fuel injection quantity is adjusted in accordance with the air intake quantity, wherein an air flow rate sensor that detects a quantity of air that is taken into the internal combustion engine is provided in at least a portion of the plurality of branch pipes.

According to this air intake apparatus for an internal combustion engine, when the internal combustion engine is operating, it is possible when a throttle valve is initially opened to directly measure in each cylinder that is equipped with an air flow rate sensor only the quantity of air that is taken into the internal combustion engine and not the air that fills the interior of the air intake manifold. Moreover, in the cylinders other than the cylinders that are equipped with an air flow rate sensor, it is possible to predict the air intake quantity using a rotation angle sensor that detects a rotation angle of a crankshaft or camshaft or the like as well as the aforementioned sensors. Note that the term "a portion of the branch pipes" refers to a number of branch pipes that is equal to or more than one and is also less than the total number of the branch pipes.

Furthermore, it is possible to perform fuel injection at an accurate timing in the cylinders that are equipped with an air flow rate sensor based on an air intake rise point that is detected by the air flow rate sensors. In addition, based on this fuel injection timing, it is possible to inject fuel at the same accurate timing as in the air flow rate sensor equipped cylinders in the cylinders other than the air flow rate sensor equipped cylinders.

Furthermore, by establishing settings such that the air intake fall point that is detected by the air flow rate sensors indicates that the air intake into the internal combustion engine has ended, it is possible to measure the air intake quantity from the point in time when the air intake commences until a point immediately prior to the air intake ending. In addition, based on this measurement information, it is possible to accurately predict an air intake quantity in the cylinders other than the air flow rate sensor equipped cylinders in the same way as in the cylinders that are equipped with an air flow rate sensor.

In the air intake apparatus for an internal combustion engine of the present invention, it is preferable that the air flow rate sensors are provided in each of the plurality of branch pipes.

According to this air intake apparatus for an internal combustion-engine, when the internal combustion engine is operating, the interior of the air intake manifold is placed in a negative pressure state by the intake negative pressure of the internal combustion engine when the throttle valve is initially opened. However, because the air that is taken into the internal combustion engine is measured by the air flow rate sensors that are placed respectively in each branch pipe on the downstream side of the air intake manifold, it is possible to measure directly in each cylinder only the quantity of air that is taken into the internal combustion engine and to exclude the air that fills the interior of the air intake manifold.

It is also possible to control fuel injections such that they are performed at the correct timing in each cylinder based on the air intake rise point detected by the air flow rate sensors.

Furthermore, by establishing settings such that an air intake fall point that is detected by the air flow rate sensors can be regarded as indicating that the intake of air into the internal combustion engine has ended, it becomes possible to measure the air intake quantity from the point in time when the air intake commenced to a point immediately prior to the air intake ending.

In the air intake apparatus for an internal combustion engine of the present invention, it is preferable that one of the air flow rate sensors is provided in the collecting pipe.

According to this air intake apparatus for an internal combustion engine, in air flow rate sensor equipped cylinders that are provided with an air flow rate sensor on a branch pipe, it is possible to directly measure only the quantity of air that is taken into the internal combustion engine and to exclude the air that fills the interior of the air intake manifold. Moreover, in cylinders other than the air flow rate sensor equipped cylinders, it is possible to more accurately measure the air intake quantity by performing processing such as subtracting the air intake quantity in the air flow rate sensor equipped cylinders from the total air intake quantity measured by the air flow rate sensor provided in the collecting pipe, and by also using a rotation angle sensor that detects rotation angles in the crankshaft or camshaft or the like.

The present invention is an air intake apparatus for an internal combustion engine that includes: an air intake manifold that has a plurality of branch pipes that are connected to an internal combustion engine and has a collecting pipe to which a throttle body is connected, in which an air intake quantity that is taken into the internal combustion engine is adjusted using a throttle valve of the throttle body, and in which a fuel injection quantity is adjusted in accordance with the air intake quantity, wherein an extended portion that extends towards the branch pipe side is provided on an end portion on the branch pipe side of the collecting pipe, and an air flow rate sensor that detects a quantity of air that is taken into the internal combustion engine is provided on this extended portion.

According to this air intake apparatus for an internal combustion engine, when the internal combustion engine is operating, when a throttle valve is initially opened, because an air flow rate sensor is placed in close proximity to each branch pipe, the sensitivity of the detection of the air flow into the internal combustion engine is increased. Accordingly, the air intake rise point and the air intake fall point of each cylinder can be ascertained. In addition, it becomes possible to perform control such that fuel is injected at an accurate timing into each cylinder based on the air intake rise point detected by an air flow rate sensor. Moreover, by establishing settings such that an air intake fall point detected by an air flow rate sensor can be regarded as indicating that the intake of air into the internal combustion engine has ended, it becomes possible to measure the air intake quantity from the point in time when the air intake commences to a point immediately prior to the ending of the air intake.

BEST MODES FOR CARRYING OUT THE INVENTION

The first embodiment of the present invention will now be described based on the drawings.

Figure 1:
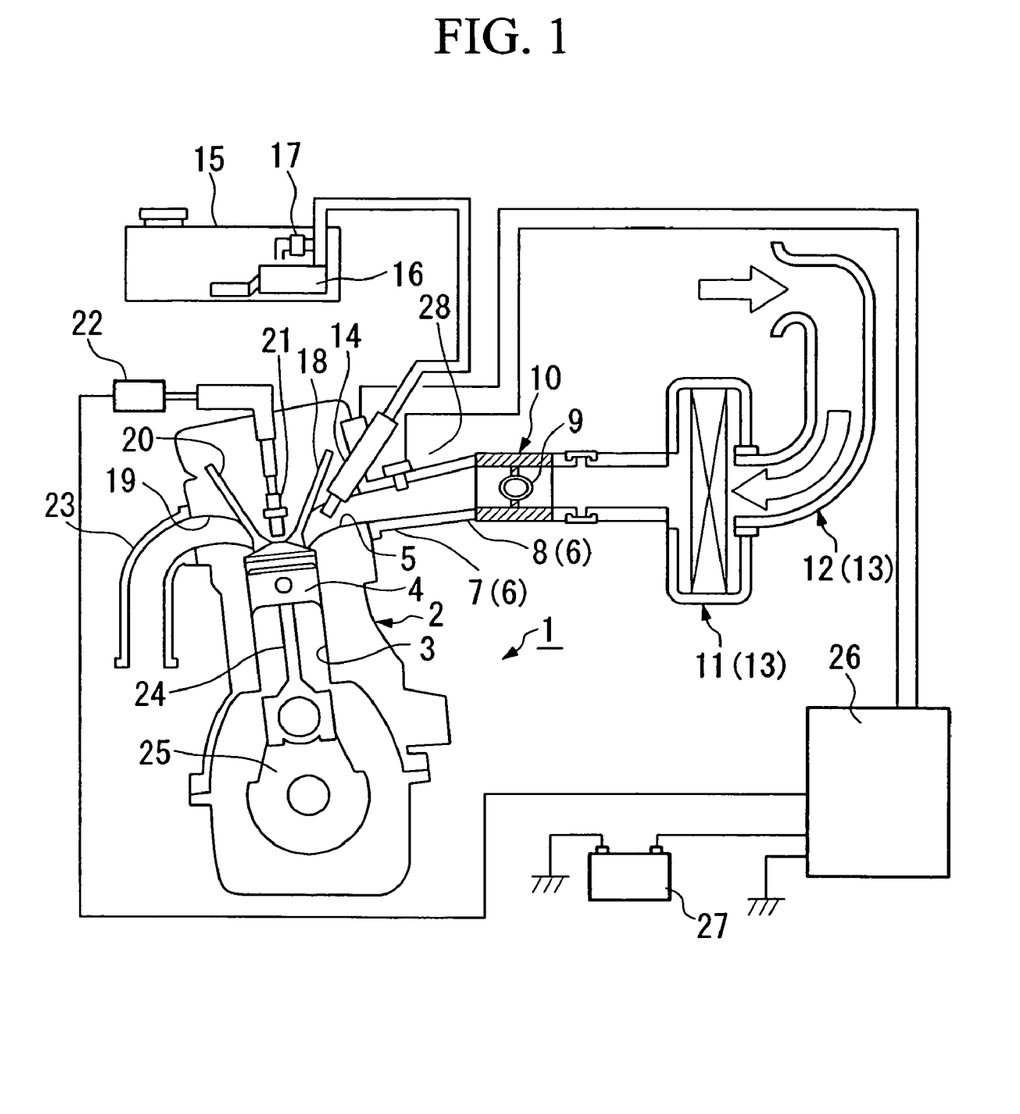
FIG. 1 is a structural view of an internal combustion engine in a first embodiment of the present invention.

As is shown in FIG. 1, an engine (i.e., an internal combustion engine) 1 is a reciprocating engine in which pistons 4 perform a rectilinear reciprocating motion inside cylinders 3 of an engine body 2. Each stroke, which is made up of an intake of air, compression, combustion (i.e., expansion) and exhaust, is repeated as a result of the pistons 4 moving reciprocally and thereby causing the volume inside the cylinders 3 to change.

Moreover, the engine 1 is a multi cylinder engine that has a plurality (four in this embodiment) of cylinders 3. A plurality of branch pipes 7 (see FIG. 2) that are on the downstream side of the air intake manifold 6 are connected respectively to apertures on the exterior side of each air intake port 5 of the engine body 2. In addition, a throttle body 10 that has a throttle valve (i.e., a diaphragm valve) 9 that adjusts the quantity of air that is taken into the engine 1 (i.e., adjusts the air intake quantity) is connected to a collecting pipe 8 that is on the upstream side of the air intake manifold 6. An air intake flow passage 13 that is formed by an air cleaner 11 and an air intake duct 12 is connected to the upstream side of the throttle body 10.

An injector (i.e., a combustion injection device) 14 is provided for each cylinder in the engine body 2 so as to face an electromagnetic combustion injection valve inside the air intake ports 5. A predetermined quantity of fuel is injected by the operation of the injectors 14 into the air flow inside the air intake ports 5. Fuel that has been pumped out from inside a fuel tank 15 by a fuel pump 16 and then undergone pressure adjustment by a regulator 17 is supplied to each injector 14.

For each cylinder in the engine body 2 there are also provided an air intake valve 18 that opens and closes a combustion chamber side aperture of the air intake ports 5, an exhaust valve 20 that opens and closes a combustion chamber side aperture of an exhaust port 19, and spark plugs 21 whose ignition electrode portion faces the interior of the combustion chamber. The ignition of the spark plugs 21 is performed using high energy that is accumulated in an ignition circuit 22, and the opening and closing operations of each air intake valve 18 and exhaust valve 20 is performed by a camshaft (not shown). Note that an exhaust manifold 23 is connected to an exterior side aperture of each exhaust portion 19.

Each piston 4 is joined to a crank pin of a crank shaft 25 via a connecting rod 24.

In addition, in a running state of the engine 1, external air (i.e., air) is drawn in from the air intake flow passage 13 by the intake negative pressure that is generated by the reciprocating motion of the pistons 4 which results from the throttle valve 9 being opened. This air is then guided via the air intake manifold 6 to the air intake ports 5 of those cylinders that are on the intake stroke. This air flow forms a fuel-air mixture together with the fuel that is injected from the injectors 14 and is taken into the cylinders 3 of those cylinders that are on an intake stroke. At this time, the quantity of fuel that is injected from the injectors 14 is adjusted in accordance with the quantity of air that is taken into the cylinders 3. The pistons 4 are made to perform their rectilinear reciprocating movement inside the cylinders 3 and the crankshaft 25 is driven to rotate by the combustion energy obtained by burning the fuel-air mixture that has been taken into the cylinders 3.

Control of the fuel injection quantity, the fuel injection timing, and the timing of the ignition of the fuel-air mixture in a running state of the engine 1 is conducted by a control unit 26. This control unit 26 is what is known as an electronic control unit (ECU) and is provided with a central processing unit (CPU) and read only memory (ROM). The control unit 26 operates by receiving electricity supplied from a battery 27. The control unit 26 performs predetermined processing using, as input data, data such as the current that is output from an air flow meter (i.e., an air flow rate sensor) 28 that is able to detect the air intake quantity taken into the engine 1 as a mass flow. The control unit 26 also outputs command signals to the respective sections.

Here, a preferred example of the air flow meter 28 of this embodiment is a sensor formed by depositing a thin platinum film on a silicon substrate and then energizing it such that the temperature of the thin platinum film is kept constant. Because the temperature of the thin platinum film drops if there is an increase in the mass of the air circulating around the thin platinum film, the air flow meter 28 causes the current being supplied to the thin platinum film to be increased so as to keep the temperature constant. In contrast, because the temperature of the thin platinum film rises if there is a decrease in the mass of the air circulating around the thin platinum film, the air flow meter 28 causes the current being supplied to the thin platinum film to be decreased. In this manner, because the current value increases and decreases proportionally to the increase and decrease in the mass of the air circulating around the thin platinum film, the air flow rate can be measured by monitoring this current value.

Figure 2:
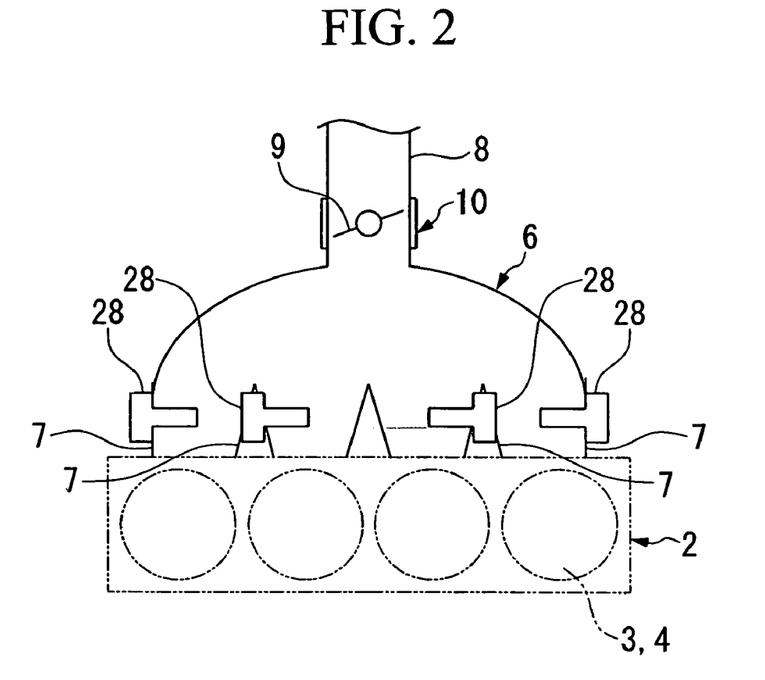
FIG. 2 is an explanatory view showing an air intake manifold and the placement of an air flow rate sensor in the first embodiment.

As is shown in FIG. 2, the air intake manifold 6 has a single collecting pipe 8 and a plurality (four in this embodiment) of branch pipes 7 corresponding to each cylinder of the engine. Air introduced from the collecting pipe 8 is distributed to each cylinder of the engine 1 via the respective branch pipes 7. Namely, the collecting pipe 8 is provided on the upstream side of the air flow of the air intake manifold 6, while the plurality of branch pipes 7 are each placed on the downstream side of the air flow of the air intake manifold 6.

An air flow meter 28 is provided on each branch pipe 7 of the air intake manifold 6. Accordingly, the air flow meters 28 are each located at a downstream position of the air flow of the air intake manifold 6 and immediately in front of the air intake port 5 of each cylinder.

Next, an operation will be described.

Firstly, if the throttle valve 9 is opened when the engine 1 is in an operating state, external air is drawn in from the air intake flow passage 13 by the intake negative pressure in the cylinders that are on the intake stroke, and is guided via the air intake manifold 6 to the air intake port 5 of those cylinders that are on the intake stroke. This air forms a fuel-air mixture by being mixed with the fuel that is injected from the injectors 14 inside the air intake ports 5 and is taken into the cylinders 3.

Here, when the throttle valve 9 is in a closed state, the interior of the air intake manifold 6 that is on the downstream side thereof is in a negative pressure state due to the intake negative pressure in each cylinder. Accordingly, when the throttle valve 9 begins to open, the air that fills (i.e., restores to atmospheric pressure) the interior of the air intake manifold 6 is drawn in together with the air that is drawn into the cylinder 3 from the air intake flow passage 13. At this time, in this embodiment, because the air flow meters 28 are located on each of the branch pipes 7 on the downstream side of the air intake manifold 6, it is possible to directly measure in each cylinder only the quantity of air that is taken into the cylinders 3 and not the air that fills the interior of the air intake manifold 6.

Moreover, based on the rise point of the intake air detected by the respective air flow meters 28, it is possible to perform control such that fuel is injected into each cylinder at the correct timing. Here, the term "rise point of the intake air" refers to when the air intake quantity, which increases with the passing of time from the moment when the air intake valve 18 was opened, reaches an air intake quantity increase predetermined value (for example, a value in excess of the range of air pulses inside the air intake manifold 6 and of overly small flow, specifically, the slight flow of air that flows in, when the throttle valve 9 is in a slightly open state, as a result of the negative pressure that is generated when the air intake valve 18 is opened remaining even when the air intake valve 18 is closed).

Furthermore, when the intake valve 18 begins to close, the intake air quantity that had increased so as to exceed the intake air quantity increase predetermined value switches so as to decrease. Here, if the time when the intake air quantity detected by each airflow meter 28 falls below an intake air quantity decrease predetermined value that is set to a value that is greater than the intake air quantity increase predetermined value is taken as a fall point in the intake air, then it is possible to establish settings such that the intake air fall point indicates that the intake of air into the cylinders 3 has finished. As a result, it becomes possible to measure the air intake quantity from the intake air rise point to the intake air fall point for each cylinder, namely, to measure the intake air quantity from the point when the air intake starts until the point immediately prior to it ending.

According to the above described embodiment, because it is possible to directly measure for each cylinder only the air that is taken into the cylinders 3 even if the throttle valve 9 is in the initial stages of being opened, the accuracy when detecting an air intake quantity is increased and it is possible to optimize the fuel injection quantity. In addition, it is possible to raise the fuel-air mixture combustion efficiency and thereby improve the response and fuel consumption of the engine 1.

Moreover, because the fuel injection timing of each cylinder is controlled based on the intake air rise points detected by the respective air flow meters 28, it is possible to dispense with the rotation angle sensor that is used conventionally to detect rotation angles of the crankshaft 25 or camshaft in order to control fuel injection timings. Accordingly, reductions in the number of components and in the cost can be achieved.

Furthermore, it is possible to perform the measuring of the intake air quantity from the point in time when an intake air valve 18 is opened until a point directly prior to the intake air valve 18 closing and the air intake being ended, and to also perform fuel injection corresponding to that intake air quantity in a single cycle of the engine 1, so that the fuel injection quantity can be optimized in real time.

Next, the second embodiment of the present invention will be described based on FIG. 3 while making reference to FIG. 1. Note that any description of structure that has already been described in the first embodiment is omitted.

Figure 3:
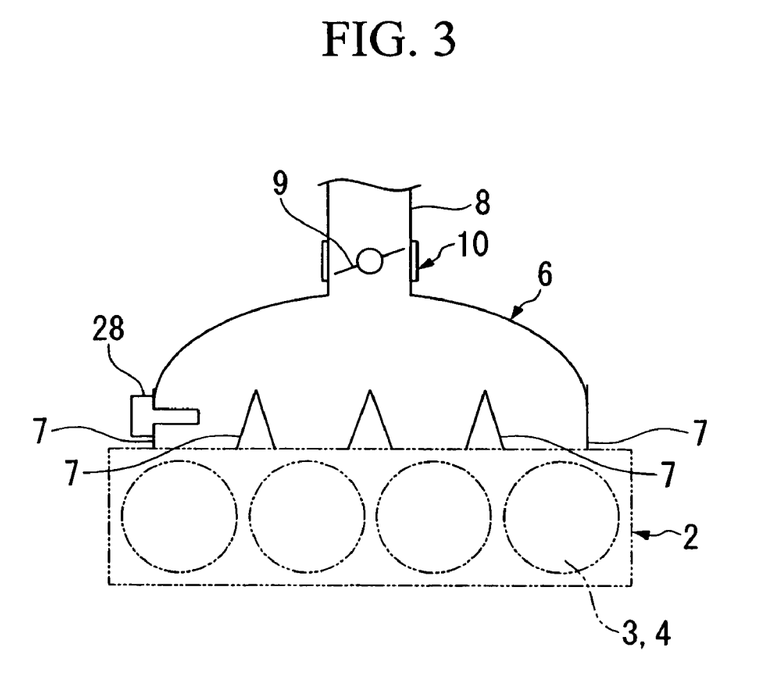
FIG. 3 is an explanatory view showing an air intake manifold and the placement of an air flow rate sensor in a second embodiment.

As is shown in FIG. 3, in the air intake apparatus for an internal combustion engine of this embodiment, an air flow meter 28 is provided on a portion (one in this embodiment) of the branch pipes 7 of the air intake manifold 6.

The operation of this embodiment will now be described. Firstly, if the throttle valve 9 is opened when the engine 1 is in an operating state, air that has been guided to the air intake ports 5 forms a fuel-air mixture by being mixed with the fuel that is injected from the injectors 14 and is taken into the cylinders 3. However, at this time, in the cylinder to which is connected the branch pipe 7 on which the air flow meter 28 is placed (referred to below as the "air flow meter equipped cylinder"), it is possible to directly measure only the quantity of air that is taken into the cylinder 3 and to exclude the air that fills the interior of the air intake manifold 6. Moreover, in the cylinders other than the air flow meter equipped cylinder, it is possible to accurately predict the air intake quantity by also providing a known rotation angle sensor that detects a rotation angle of the crankshaft 25 or camshaft, and ascertaining reverse flow components in the air flow meter equipped cylinder.

Moreover, based on the rise point of the intake air detected by the respective air flow meters 28, it is possible to perform control such that fuel is injected into each cylinder at the correct timing. In addition, based on this fuel injection timing, it is possible, when angle detection information from a rotation angle sensor for the crankshaft 25 or camshaft is added thereto, to perform fuel injection at the same accurate timing as for the air flow meter equipped cylinder in the cylinders other than the air flow meter equipped cylinders.

Furthermore, by establishing settings such that the air intake fall point that is detected by the air flow meter 28 indicates that the air intake into the cylinder 3 has ended, it is possible to measure the air intake quantity from the point in time when the air intake valve 18 is opened until a point immediately prior to the air intake valve 18 closing and the intake of air ending. In addition, based on this measurement information, it is possible to accurately predict an air intake quantity in the cylinders other than the air flow meter equipped cylinders in the same way as in the cylinder that is equipped with an air flow meter.

According to the above described second embodiment, because the air intake quantity in each cylinder can be accurately measured or predicted even when the throttle valve 9 is in the initial stages of opening, it is possible to achieve a considerable reduction in costs, compared with when an air flow meter 28 is placed on every one of the branch pipes 7, and fuel injection quantities can be optimized.

Moreover, by using a combination of the respective air flow meters 28 and a known crankshaft 25 or camshaft rotation angle sensor, fuel injection can be performed at the correct timing in each cylinder, and by measuring or predicting the air intake quantity from the point in time when the air intake commenced until a point immediately prior to the air intake ending, optimization of the fuel injection quantity can be achieved in real time.

Note that, in the above described second embodiment, the air flow meter 28 is provided in only one branch pipe 7, however, the same operation and effect can be obtained even if, for example, an air flow meter 28 is provided in two cylinders having different phases, or if air flow meters 28 are provided in less than the total number of branch pipes 7.

Next, the third embodiment of the present invention will be described based on FIG. 4 while making reference to FIG. 1. Note that any description of structure that has already been described in the first embodiment is omitted.

Figure 4:
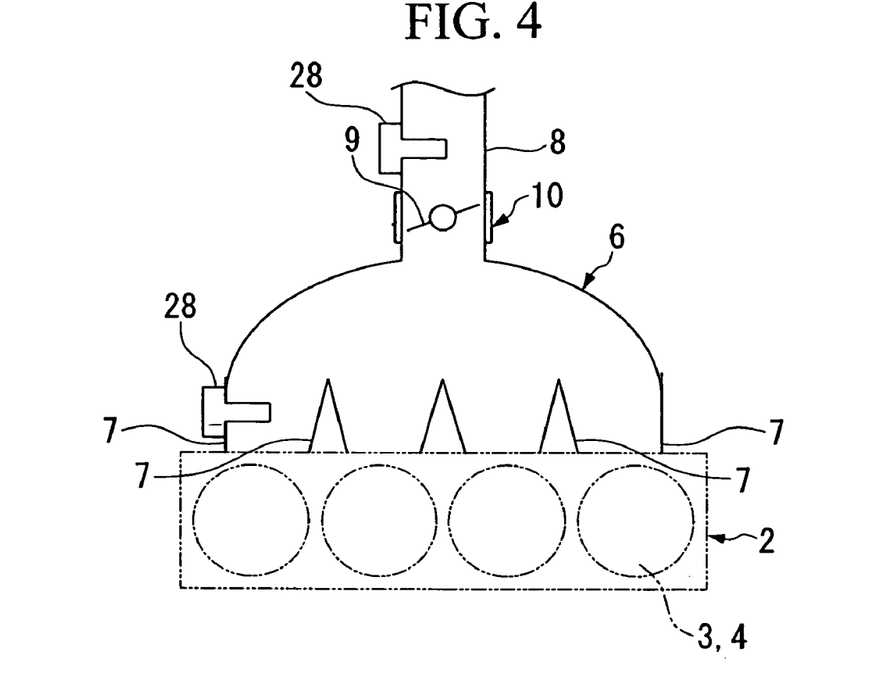
FIG. 4 is an explanatory view showing an air intake manifold and the placement of an air flow rate sensor in a third embodiment.

As is shown in FIG. 4, in the air intake apparatus for an internal combustion engine of this embodiment, an air flow meter 28 is provided on a portion (one in this embodiment) of the branch pipes 7 of the air intake manifold 6. In addition, a separate air flow meter 28 is also provided on the collecting pipe 8 of the air intake manifold 6. The air flow meter that is provided on the collecting pipe 8 is located upstream from the throttle valve 9 and is able to measure the total air intake quantity passing through the collecting pipe 8.

The operation of this embodiment will now be described. In the air flow meter equipped cylinders, it is possible to directly measure only the air intake quantity that is taken into the cylinders 3 and to exclude the air that fills the interior of the air intake manifold 6. Moreover, in the cylinders other than the air flow meter equipped cylinders, it is possible to more accurately measure the air intake quantity by performing processing such as subtracting the air intake quantity in the air flow meter equipped cylinders from the total air intake quantity measured by the air flow meters 28 provided in the collecting pipe 8, and by performing control such as adding thereto angle information from the rotation angle sensor for the crankshaft 25 or camshaft, and then injecting fuel at an accurate injection timing in each cylinder.

According to the above described third embodiment, by providing an air flow meter 28 upstream from the throttle body 10 that is also joined to the collecting pipe 8, it is possible to more accurately predict the air intake quantity in cylinders other than the air flow meter equipped cylinders.

Note that in the above described third embodiment, it is also possible for the air flow meter 28 that is located on the collecting pipe 8 to be placed downstream from the throttle valve 9. In particular, if the air flow meter 28 is located on the throttle body 10, the number of setting steps can be reduced.

Next, the fourth embodiment of the present invention will be described based on FIG. 5 while making reference to FIG. 1. Note that any description of structure that has already been described in the first embodiment is omitted.

Figure 5:
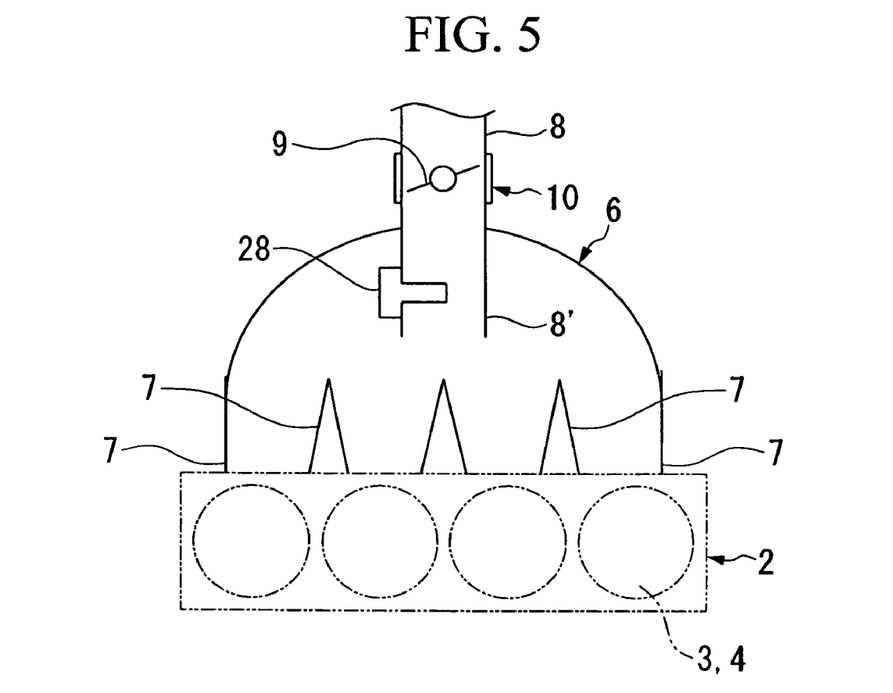
FIG. 5 is an explanatory view showing an air intake manifold and the placement of an air flow rate sensor in a fourth embodiment.

As is shown in FIG. 5, in the air intake apparatus for an internal combustion engine of this embodiment, an extended portion 8' that extends towards the branch pipes 7 is provided at an end portion on the downstream side of the collecting pipe 8 of the air intake manifold 6, namely, at an end portion on the branch pipe 7 side. An air flow meter 28 is provided on this extended portion 8'. As a result, the air flow meter 28 can be placed in close proximity to the respective branch pipes 7.

The operation of this embodiment will now be described. Firstly, if the throttle valve 9 is opened when the engine 1 is in an operating state, air that has been guided to the air intake ports 5 is mixed with the fuel that is injected from the injectors 14 so as to form a fuel-air mixture and is taken into the cylinders 3. However, at this time, because the air flow meter 28 is placed in close proximity to the respective branch pipes 7, the sensitivity of the detection of the air flow into the cylinders 3 is increased, and the rise point and fall point of the air intake can be ascertained. In addition, it becomes possible to perform control such that fuel is injected at an accurate timing into each cylinder based on the rise point detected by the air flow meter 28. Moreover, by establishing settings such that a fall point detected by the air flow meter 28 can be regarded as indicating the ending of the intake of air into the engine 1, it becomes possible to measure the air intake quantity from the point in time when the air intake commenced to a point immediately prior to the air intake ending.

According to the above described fourth embodiment, by setting the number of air flow meters 28 at one, it is possible to achieve a considerable reduction in cost while ascertaining the rise point and fall point of the intake of air into each cylinder. In the present embodiment, in the same way as in the second embodiment, by performing control such that fuel is injected at an accurate injection timing into each cylinder by also using angle information from a crankshaft 25 or camshaft rotation angle sensor, it becomes possible to inject fuel at an accurate timing into each cylinder based on the rise point detected by the air flow meter 28. In addition, by measuring the air intake quantity from the point in time when the air intake commences in each cylinder to a point immediately prior to the air intake ending based on the fall point detected by the air flow meter 28, it is possible to optimize the fuel injection quantity in real time. Accordingly, the combustion efficiency of the fuel-air mixture can be increased and the response and fuel consumption of the engine 1 can thereby be improved.

Note that, in the above described fourth embodiment, the extended portion 8' may be formed integrally with the air intake manifold 6 or separately from the air intake manifold 6.

Note also that the present invention is not limited to the above described embodiments. For example, the air flow meters 28 are formed by depositing a thin platinum film on a silicon substrate, however, other air flow sensors may be used provided that they are able to detect the intake air flow rate.

Moreover, the internal combustion engine to which the present invention is applied is not limited to an in-line four cylinder engine, and it may also be applied when the engine is a single cylinder engine. Furthermore, the present invention can also be applied not only to port injection engines that inject fuel into an air intake port 5, but also to direct injection type engines that inject fuel into a combustion chamber. In this case, the air intake quantity is measured from the point in time when the air intake valve 18 is opened until the point when air intake valve 18 is closed and the intake of air is ended, and the fuel injection quantity can be optimized in real time and to an even higher degree in accordance with this air intake quantity.

INDUSTRIAL APPLICABILITY

The present invention relates to an air intake apparatus for an internal combustion engine that includes: an air intake manifold that has a plurality of branch pipes that are connected to an internal combustion engine and has a collecting pipe to which a throttle body is connected, in which an air intake quantity that is taken into the internal combustion engine is adjusted using a throttle valve of the throttle body, and in which a fuel injection quantity is adjusted in accordance with the air intake quantity, wherein an air flow rate sensor that detects a quantity of air that is taken into the internal combustion engine is provided in at least a portion of the plurality of branch pipes.

According to the air intake apparatus for an internal combustion engine of the present invention, it is possible, even when the throttle valve is in the initial stages of being opened, to measure or predict only the quantity of air that is taken into an internal combustion engine, and, compared with when an air flow rate sensor is placed in each one of the total number of branch pipes, the fuel injection quantity can be optimized while costs can be greatly reduced. In addition, the efficiency of the fuel-air mixture combustion can be increased while the response and fuel consumption of the internal combustion engine can be improved.

Moreover, by using the respective air flow rate sensors in combination with a rotation angle sensor for a crankshaft or camshaft or the like, it is possible to perform fuel injection at the correct timing for each cylinder. In addition, by performing the measurement of the air intake quantity and then performing fuel injection that corresponds to this air intake quantity within a single cycle of the internal combustion engine, it becomes possible to optimize the fuel injection quantity in real time.

According to the air intake apparatus for an internal combustion engine of the present invention, because it is possible by providing the air flow rate sensors in each of the plurality of branch pipes to directly measure for each cylinder only the quantity of air that is taken into the internal combustion engine even if the throttle valve is in the initial stages of being opened, the accuracy when detecting an air intake quantity is increased and it is possible to optimize the fuel injection quantity. In addition, it is possible to raise the fuel-air mixture combustion efficiency and thereby improve the response and fuel consumption of the internal combustion engine.

Moreover, because the fuel injection timing of each cylinder is controlled based on an intake air rise point detected by an air flow rate sensor, it is possible to dispense with the rotation angle sensor that is used conventionally to detect rotation angles of a crankshaft or camshaft in order to control fuel injection timings. Accordingly, reductions in the number of components and in the cost can be achieved.

Furthermore, it is possible to perform the measuring of the air intake quantity from a point in time when the air intake commences until a point directly prior to the air intake ending, and to also perform fuel injection corresponding to that intake air quantity in a single cycle of the internal combustion engine, so that the fuel injection quantity can be optimized in real time.

According to the air intake apparatus for an internal combustion engine of the present invention, by providing an air flow rate sensor on the collecting pipe as well, it becomes possible to more accurately predict the air intake quantities in cylinders other than the cylinders that are equipped with an air flow rate sensor.

The present invention also relates to an air intake apparatus for an internal combustion engine that includes: an air intake manifold that has a plurality of branch pipes that are connected to an internal combustion engine and has a collecting pipe to which a throttle body is connected, in which an air intake quantity that is taken into the internal combustion engine is adjusted using a throttle valve of the throttle body, and in which a fuel injection quantity is adjusted in accordance with the air intake quantity, wherein an extended portion that extends towards the branch pipe side is provided on an end portion on the branch pipe side of the collecting pipe, and an air flow rate sensor that detects a quantity of air that is taken into the internal combustion engine is provided on this extended portion.

According to the air intake apparatus for an internal combustion engine of the present invention, by setting the number of air flow rate sensors at one, it is possible to achieve a considerable reduction in cost while ascertaining the rise point and fall point of the intake of air into each cylinder. As a result, it becomes possible to inject fuel at the correct timing into each cylinder based on the rise point. In addition, it becomes possible to measure the air intake quantity from the point in time when the air intake commences in each cylinder to a point immediately prior to the air intake ending, and to perform fuel injection corresponding to that intake air quantity in a single cycle of the internal combustion engine. Namely, it becomes possible to optimize the fuel injection quantity in real time. Accordingly, the combustion efficiency of the fuel-air mixture can be increased and the response and fuel consumption of the internal combustion engine can thereby be improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

The invention claimed is:

1. An air intake apparatus for an internal combustion engine comprising:

an air intake manifold that has a plurality of branch pipes that are connected to an internal combustion engine and has a collecting pipe to which a throttle body is connected, in which an air intake quantity that is taken into the internal combustion engine is adjusted using a throttle valve of the throttle body, and in which a fuel injection quantity is adjusted in accordance with the air intake quantity, wherein an extended portion that extends towards the branch pipe side is provided on an end portion on the branch pipe side of the collecting pipe, and an air flow rate sensor that detects a quantity of air that is taken into the internal combustion engine is provided on this extended portion.

* * * * *